(12) United States Patent
Nichols et al.

(10) Patent No.: US 8,550,338 B1
(45) Date of Patent: Oct. 8, 2013

(54) CASH SUPPLY CHAIN NOTIFICATIONS

(75) Inventors: Michelle Nichols, Rock Hill, SC (US);
Todd Atwood, Charlotte, NC (US);
James Heddleson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 571 days.

(21) Appl. No.: 12/262,908

(22) Filed: Oct. 31, 2008

Related U.S. Application Data (60) Provisional application No. 61/061,987, filed on Jun. 16, 2008.

(51) Int. Cl.
*G06K 7/00* (2006.01)

(52) U.S. Cl.
USPC ............... 235/379; 235/375; 235/380; 705/5; 705/35

(58) Field of Classification Search
None
See application file for complete search history.

(56) References Cited

U.S. PATENT DOCUMENTS

| | | | |
|---|---|---|---|
| 3,618,059 A | 11/1971 | Allen | |
| 4,352,097 A | 9/1982 | Hamann | |
| 4,443,692 A | 4/1984 | Nishimura | |
| 5,453,601 A | 9/1995 | Rosen | |
| 5,689,240 A | 11/1997 | Traxler | |
| 5,748,906 A | 5/1998 | Sandig | |
| 5,748,908 A | 5/1998 | Yu | |
| 5,936,220 A | 8/1999 | Hoshino et al. | |
| 5,952,639 A | 9/1999 | Ohki et al. | |
| 5,952,920 A | 9/1999 | Braddick | |
| 5,953,423 A | 9/1999 | Rosen | |
| 5,963,131 A | 10/1999 | D'Angelo et al. | |
| 6,028,517 A | 2/2000 | Sansone et al. | |
| 6,055,438 A | 4/2000 | Winner, Jr. | |
| 6,122,625 A | 9/2000 | Rosen | |
| 6,167,378 A | 12/2000 | Webber, Jr. | |
| 6,260,024 B1 | 7/2001 | Shkedy | |
| 6,483,433 B2 * | 11/2002 | Moskowitz et al. | ....... 340/568.1 |
| 6,487,542 B2 | 11/2002 | Ebata et al. | |
| 6,491,216 B1 | 12/2002 | May | |

(Continued)

FOREIGN PATENT DOCUMENTS

| | | |
|---|---|---|
| DE | 4019265 C1 | 11/1991 |
| DE | 4429815 | 2/1996 |

(Continued)

OTHER PUBLICATIONS

International Search Report for PCT/US2009/047452, dated Aug. 25, 2009, pp. 1-4.

(Continued)

*Primary Examiner* — Michael G Lee
*Assistant Examiner* — Matthew Mikels
(74) *Attorney, Agent, or Firm* — Banner & Witcoff, Ltd.; Michael A. Springs (57) ABSTRACT

An aspect of the invention provides methods, computer media, and apparatuses to generate notifications to verify processing of a deposit or change order along a cash supply chain. A user is provided automated alerts that are responsive to detected events, where an event may correspond to an occurrence happening or an occurrence not happening within a predetermined duration. Notification settings may be configured based on a user input. Based on the notification settings, status information is monitored from stages along the cash supply chain. When a corresponding event is detected, a notification is automatically sent to the user over a communications channel.

25 Claims, 5 Drawing Sheets

(56) References Cited

U.S. PATENT DOCUMENTS

| | | |
|---|---|---|
| 6,498,603 B1 | 12/2002 | Wallace |
| 6,526,273 B1 | 2/2003 | Link, II et al. |
| 6,736,314 B2 | 5/2004 | Cooper et al. |
| 6,788,203 B1 | 9/2004 | Roxbury et al. |
| 6,845,905 B2 | 1/2005 | Blad et al. |
| 7,004,385 B1 | 2/2006 | Douglass |
| 7,042,360 B2 | 5/2006 | Light et al. |
| 7,076,458 B2 | 7/2006 | Lawlor et al. |
| 7,149,336 B2 | 12/2006 | Jones et al. |
| 7,201,313 B1 | 4/2007 | Ramachandran |
| 7,212,992 B1 | 5/2007 | Kanevsky et al. |
| 7,216,800 B1 | 5/2007 | Ramachandran |
| 7,243,080 B2 | 7/2007 | Bhadra |
| 7,248,160 B2 | 7/2007 | Mangan et al. |
| 7,284,692 B1 | 10/2007 | Douglass |
| 7,350,230 B2 | 3/2008 | Forrest |
| 7,375,638 B2 | 5/2008 | Light et al. |
| 7,461,780 B2 | 12/2008 | Potts et al. |
| 7,537,153 B2 | 5/2009 | Hurwitz et al. |
| 7,577,612 B2 | 8/2009 | Waller et al. |
| 7,588,185 B2 | 9/2009 | Berquist et al. |
| 7,623,033 B2 | 11/2009 | Ainsworth et al. |
| 7,659,816 B2 | 2/2010 | Wandel |
| 7,714,708 B2 | 5/2010 | Brackmann et al. |
| 7,778,456 B2 | 8/2010 | Jones et al. |
| 7,908,188 B2 | 3/2011 | Flynn et al. |
| 2001/0051922 A1 | 12/2001 | Waller et al. |
| 2001/0054643 A1 | 12/2001 | Siemens |
| 2002/0052193 A1 | 5/2002 | Chetty |
| 2002/0052794 A1 | 5/2002 | Bhadra |
| 2002/0091937 A1 | 7/2002 | Ortiz |
| 2002/0095588 A1 | 7/2002 | Shigematsu et al. |
| 2002/0111916 A1 | 8/2002 | Coronna et al. |
| 2002/0138424 A1 | 9/2002 | Coyle |
| 2002/0194122 A1 | 12/2002 | Knox et al. |
| 2002/0195309 A1 | 12/2002 | Pope |
| 2003/0011466 A1 | 1/2003 | Samuel et al. |
| 2003/0050891 A1 | 3/2003 | Cohen |
| 2003/0061153 A1 | 3/2003 | Birdsong et al. |
| 2003/0083936 A1 | 5/2003 | Mueller et al. |
| 2003/0122671 A1 | 7/2003 | Jespersen |
| 2003/0163710 A1 | 8/2003 | Ortiz et al. |
| 2003/0177102 A1 | 9/2003 | Robinson |
| 2003/0208431 A1* | 11/2003 | Raynes et al. .................. 705/36 |
| 2003/0213843 A1 | 11/2003 | Jackson |
| 2003/0234719 A1 | 12/2003 | Denison et al. |
| 2004/0016796 A1 | 1/2004 | Hanna et al. |
| 2004/0056767 A1 | 3/2004 | Porter |
| 2004/0083149 A1 | 4/2004 | Jones |
| 2004/0100379 A1 | 5/2004 | Boman et al. |
| 2004/0111346 A1 | 6/2004 | Macbeath et al. |
| 2004/0124966 A1 | 7/2004 | Forrest |
| 2004/0201454 A1 | 10/2004 | Waterhouse et al. |
| 2005/0027594 A1 | 2/2005 | Yasnovsky et al. |
| 2005/0091129 A1 | 4/2005 | Tien |
| 2005/0108164 A1* | 5/2005 | Salafia et al. .................. 705/42 |
| 2005/0183928 A1 | 8/2005 | Jones et al. |
| 2005/0258234 A1 | 11/2005 | Silverbrook et al. |
| 2005/0273347 A1 | 12/2005 | Dudley et al. |
| 2006/0131395 A1 | 6/2006 | Potts et al. |
| 2006/0247973 A1 | 11/2006 | Mueller et al. |
| 2006/0271441 A1 | 11/2006 | Mueller et al. |
| 2006/0282277 A1 | 12/2006 | Ng |
| 2006/0288233 A1 | 12/2006 | Kozlay |
| 2007/0005452 A1 | 1/2007 | Klingenberg et al. |
| 2007/0008118 A1 | 1/2007 | Kassiedass |
| 2007/0012602 A1 | 1/2007 | Baldassari et al. |
| 2007/0034693 A1* | 2/2007 | Jouvin et al. .................. 235/384 |
| 2007/0063016 A1 | 3/2007 | Myatt et al. |
| 2007/0174156 A1 | 7/2007 | Emde et al. |
| 2007/0198341 A1 | 8/2007 | Park |
| 2007/0226142 A1 | 9/2007 | Hanna et al. |
| 2007/0282724 A1 | 12/2007 | Barnes et al. |
| 2008/0005019 A1 | 1/2008 | Hansen |
| 2008/0005578 A1 | 1/2008 | Shafir |
| 2008/0103959 A1 | 5/2008 | Carroll et al. |
| 2008/0120237 A1 | 5/2008 | Lin |
| 2008/0126515 A1 | 5/2008 | Chambers et al. |
| 2008/0149706 A1 | 6/2008 | Brown et al. |
| 2008/0155269 A1 | 6/2008 | Yoshikawa |
| 2008/0199155 A1 | 8/2008 | Hagens et al. |
| 2008/0223930 A1* | 9/2008 | Rolland et al. ................ 235/385 |
| 2008/0249934 A1* | 10/2008 | Purchase et al. ............... 705/40 |
| 2008/0262949 A1 | 10/2008 | Bond et al. |
| 2008/0265019 A1 | 10/2008 | Artino et al. |
| 2008/0303903 A1 | 12/2008 | Bentley et al. |
| 2009/0006249 A1 | 1/2009 | Morgan et al. |
| 2009/0006250 A1 | 1/2009 | Bixler et al. |
| 2009/0032580 A1 | 2/2009 | Blachowicz et al. |
| 2009/0051566 A1 | 2/2009 | Olsen et al. |
| 2009/0051769 A1 | 2/2009 | Kuo et al. |
| 2009/0065573 A1 | 3/2009 | Potts et al. |
| 2009/0107800 A1 | 4/2009 | Nishida et al. |
| 2009/0114716 A1 | 5/2009 | Ramachandran |
| 2009/0164364 A1 | 6/2009 | Galit et al. |
| 2009/0187482 A1 | 7/2009 | Blount et al. |
| 2009/0216662 A1 | 8/2009 | Crist et al. |
| 2010/0052844 A1 | 3/2010 | Wesby |
| 2010/0076853 A1 | 3/2010 | Schwarz |
| 2010/0274723 A1 | 10/2010 | Joab |

FOREIGN PATENT DOCUMENTS

| | | |
|---|---|---|
| DE | 19512045 | 10/1996 |
| DE | 19846452 | 12/1999 |
| DE | 20013021 | 11/2000 |
| DE | 102004039365 | 2/2006 |
| DE | 102005047711 | 4/2007 |
| EP | 1477949 | 11/2004 |
| GB | 2304953 | 3/1997 |
| WO | 9933040 A | 7/1999 |
| WO | 03034359 A | 4/2003 |
| WO | 2005041385 | 5/2005 |
| WO | 2005106722 | 11/2005 |

OTHER PUBLICATIONS

Powerpoint Presentation, DTS Product Overview, IFS, Apr. 2006, 17 pages.

Durbin, "Ford's F-150 goes high-tech", retrieved from <http://www.wheels.ca/article/173134>, Feb. 6, 2008, 4 pages.

Monthly Minutes from Banking Technology Operations Standing Committee (BTO), dated Mar. 20, 2007, 2 pages.

Hem, "Adaptation/Loomis cashes in on technology/The armored car company defies obsolescence despite a declining use of coins and bills", Houston Chronicle, retrieved from <http://www.chron.com/CDA/archives/archive.mpl?id=2008_4523451>, Mar. 1, 2008, 2 pages.

Powerpoint Presentation, Guck, "PakTrak", Cash Shipment Package Tracking Concept Overview, Draft-Version 1.0, Mar. 14, 2008, 17 pages.

Powerpoint Presentation, RFID in Banking, May 21, 2008, 12 pages.

Monthly Minutes for RFID SIG dated Mar. 19, 2008, 2 pages.

Non-Final Office mailed Mar. 12, 2010 issued in related U.S. Appl. No. 12/263,041.

Office Action from related U.S. Appl. No. 12/262,534 mailed Jun. 24, 2010 (17 pages).

Oracle Database SQL Reference, 10g Release 1 (10.1), Part No. B10759-01, Dec. 2003.

Final Office Action for U.S. Appl. No. 12/262,908 dated Aug. 18, 2010.

Non-Final Office Action for U.S. Appl. No. 12/262,432 dated Aug. 18, 2010.

Non-Final Office Action for U.S. Appl. No. 12/263,041 dated Sep. 2, 2010.

European Search Report in EP09007879 dated Oct. 1, 2009.

European Search Report in EP09007878 dated Oct. 1, 2009.

Office Action from related U.S. Appl. No. 12/262,928 mailed Nov. 10, 2010, pp. 1-14.

Office Action from related U.S. Appl. No. 12/262,523 mailed Nov. 9, 2010, pp. 1-9.

(56) References Cited

OTHER PUBLICATIONS

Office Action from related U.S. Appl. No. 12/263,115 mailed Nov. 16, 2010, pp. 1-11.
Non-Final Office Action for U.S. Appl. No. 12/262,448 dated Sep. 15, 2010.
Non-Final Office Action for U.S. Appl. No. 12/262,526 dated Sep. 16, 2010.
Office Action from U.S. Appl. No. 12/263,041, mailed Jan. 26, 2011.
Office Action from related U.S. Appl. No. 12/262,532 mailed Nov. 26, 2010, pp. 1-8.
Office Action from related U.S. Appl. No. 12/262,526 mailed Nov. 23, 2010, pp. 1-10.
Office Action from related U.S. Appl. No. 12/262,432 mailed Dec. 7, 2010, pp. 1-13.
PR Newswire: "Airborne Express Announces New Pricing": New York, Jan. 29, 2001.
Anonymous; "Parcel Pickup now a click away at Canada Post"; Canada Newswire, Aug. 31, 2011.

* cited by examiner

CASH SUPPLY CHAIN NOTIFICATIONS

CROSS-REFERENCE TO RELATED APPLICATIONS

This application claims priority to U.S. provisional patent application Ser. No. 61/061,987, filed Jun. 16, 2008, entitled "Cash Supply Chain Improvements," hereby incorporated herein by reference as to its entirety.

BACKGROUND

The cash supply chain is manual, complex, has inherent risk issues, and is dispersed throughout a network of customers, armored carriers, the Fed (Federal Reserve), and/or a network of client facing devices including but not limited to automatic teller machines (ATMs), cash vaults, banking centers, safes, cash recyclers, and other cash handling devices. The costs of depositing, distributing, and managing cash across a major bank, as well as the amount of daily excess cash carried by such a bank, can be on the order of billions of dollars.

Today's client deposit process does not adequately allow clients to view the status of their deposit as it makes it's way from the client's site where the deposit was prepared to the bank or bank's representative who will continue the processing of the deposit. Deposit's are handled multiple times in the current process (and possibly by many different parties), which increases potential errors and complicates finding missing deposits or understanding where errors occurred and assigning fiduciary responsibility for those errors. Pertinent pieces of deposit data are typically manually entered and reentered into various systems throughout the end-to-end processing of the deposit. The collaboration and sharing of information across multiple organizations and with multiple vendors may make this process very complex and increases risk to the bank and bank clients.

SUMMARY

The following presents a simplified summary of aspects of the invention in order to provide a basic understanding of some aspects of the invention. This summary is not an extensive overview, and is not intended to identify key or critical elements or to delineate the scope of the claims. The following summary merely presents some concepts and aspects in a simplified form as a prelude to the more detailed description provided below.

Aspects as described herein are directed to tracking monetary packages, which may contain monetary items such as foreign and domestic government-issued legal-tender paper currency, coins, checks, coupons, food stamps, credit cards, negotiable money orders, and/or other negotiable instruments as well as non-negotiable collateral information, throughout the cash supply chain. In carrying out daily financial transactions, it is typical for monetary packages to be physically transferred between various parties, such as but not limited to a bank client (or a client of another financial institution who is leveraging the services of the bank), a transporter (e.g., an armored carrier), a bank vault, and even various stations within a bank vault. This transfer amongst various parties is referred to as the cash supply chain. Because many types of cash are reusable/recyclable, the same physical cash is usually cycled through the cash supply chain multiple times.

For transport through the cash supply chain, a financial transaction such as a deposit including one or more monetary items is normally bundled or otherwise packaged together as a monetary package. Depending upon the location within the cash supply chain, the monetary package may maintain together a quantity of monetary items as a single entity by way of, e.g., a bag (in which the monetary items are placed within the bag, which may be sealed), by way of a cassette for holding the monetary items, and/or by way of one or more straps (which may also be within the bag).

While a number of techniques to automate transaction handling have been attempted, there remains a need to increase the efficiency and accuracy of the financial transaction process. Consequently, it is desirable to increase the speed and accuracy of the financial transactions and to reduce the labor required to perform the transactions. It is also desirable to make information relating to the financial transaction rapidly available to the client, third party vendors, and the bank, and to identify more quickly problematic locations in the financial transaction, provide loss prevention, and identify industry trends. Information about a deposit or withdrawal, for instance, should be provided in an expeditious fashion as it is processed along a cash supply chain, where notification/reporting is customizable and automatic for enhancing the client's experience and for improving internal processes of a bank.

According to further aspects, monetary packages are tracked via a centralized tracking system that communicates with the various parties handling the monetary packages throughout the entire supply chain and/or when a carrier is set to arrive. Each time a monetary package changes status in the cash supply chain (e.g., transfers from one party to another or changes physical location), an involved party (e.g., the party receiving the monetary package and/or the party providing the monetary package) updates the centralized tracking system with the status. The centralized tracking system may be updated using a network of automated sensors that do not necessarily require the intervention of a party to create the update. These updates may be communicated to the centralized tracking system (system of record) in real time or near real time. Such a centralized tracking system may allow the bank or other service provider to offer a variety of services to the client.

For instance, centralized monetary package tracking may allow for more accurate reporting of monetary package status. And, by pre-scheduling (initiation) of deposits and change orders into the centralized tracking system, anomalies in the transport of a monetary package (e.g., a lost or delayed cash package) may be recognized much earlier, even prior to actual deposit or arrival of the package at the processing site.

Another potential benefit of centralized monetary package tracking may include timely generation of notifications to verify processing of a deposit or change order along a cash supply chain or to provide pre-notice of a pickup for a scheduled or emergency situation.

Accordingly, still further aspects are directed to methods, apparatuses, and computer-readable media storing computer-executable instructions, for providing automated alerts and notifications via an electronic or paper based notification channel, which could include but are not limited to fax, automated voice message, text message, email, pager message, or on-line banner or other message, of a deposit's status. The client and/or the bank may be provided with automated alerts that are triggered by detected events. An event may correspond to an occurrence happening or an expected occurrence not happening within a predetermined duration.

According to another aspect, methods, apparatuses, and computer-executable instructions stored on a computer-readable media configure a notification setting, monitor status information from a selected stage in a cash supply chain, detect an event in the cash supply chain based on the status information, and generate a notification when the event is detected based on the notification setting. Notifications may apply to operational monitoring for a system or transaction as well as client-defined events.

According to another aspect, different event types along a cash supply chain may be selected. Exemplary event types include: a monetary package changing custody, a deposit bag, or other monetary package opened by an unauthorized person, a pickup by an armored carrier, a transfer to a barn of an armored carrier, a transfer to a cash vault, a discrepancy for a monetary package, and tampering with a deposit package. All events will be recorded in the central or distributed data base(s) and can be viewed, or used to generate notifications or reports for people authorized at the proper level to see the various events.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

The following terms are used herein to intend the following: alarm—a warning; reporting—to relate to or tell about; notification—something by which notice is given; and monetary package—bundle of currency, checks, credit cards, negotiable instruments and may include a bag. A notification may encompass an alarm or reporting. A cassette is a container that holds cash (currency). A cassette is often used in a cash recycler to collect currency by denomination.

Figure 1:
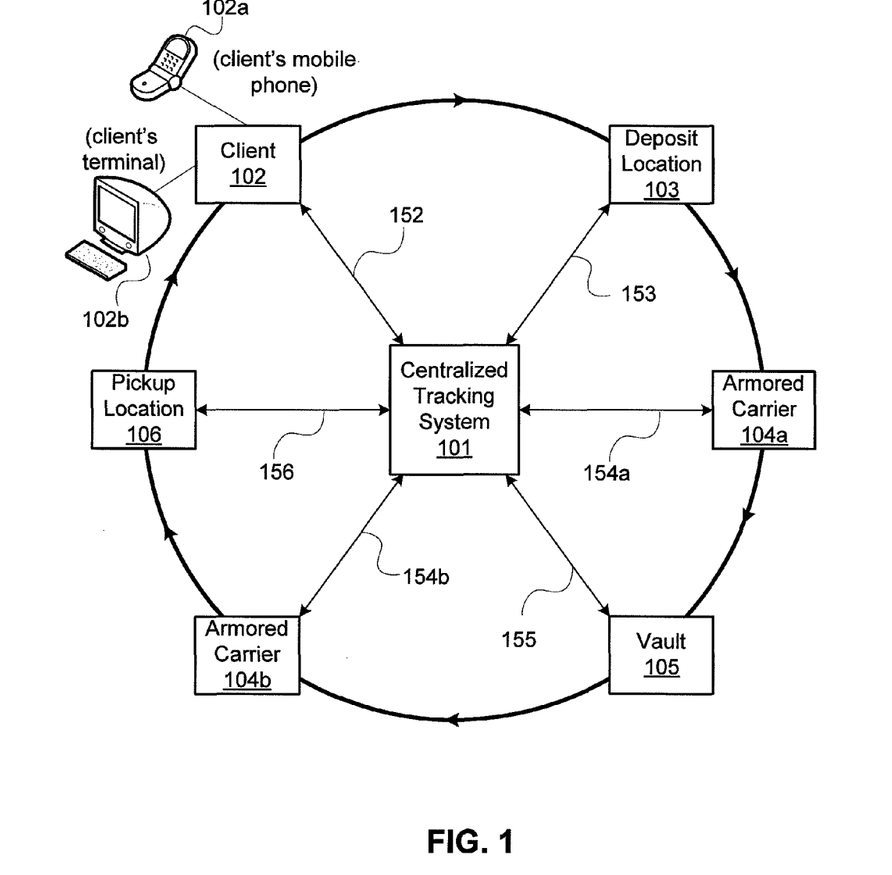
FIG. 1 is a graphical depiction of an illustrative cash supply chain for a deposit/withdrawal lifecycle, including a centralized tracking system.

FIG. 1 is a graphical depiction of an illustrative cash supply chain for a monetary item deposit/withdrawal lifecycle. In this example, a centralized tracking system 101 communicates with various parties, such as a bank client 102, a deposit location 103, an armored carrier 104 or other transport service, a bank vault 105, and a pickup location 106. Communication between centralized tracking system 101 and the various parties 102-106 may be performed across any one or more communication media. Examples of communication media include, but are not limited to, a network such as the Internet, a local-area network or LAN, a wireless LAN or WLAN, and/or a telephone network such as a landline telephone network and/or a cellular telephone network. Other examples of communication media include a dedicated landline link and/or satellite or other wireless link. While not explicitly shown, monetary items may be processed internally within a node (e.g., within bank vault 105). Consequently, each node may have a network within itself.

Centralized tracking system 101 may include at least one computing device and at least one computer-readable medium that, together, are configured to receive monetary package status reports from parties such as parties 102-106, maintain data representing the monetary package status, and generate reports and alert messages from that monetary package status data. A "computing device" as referred to herein includes any electronic, electro-optical, and/or mechanical device, or system of physically separate such devices, that is able to process and manipulate information, such as in the form of data. Non-limiting examples of a computing device includes one or more personal computers (e.g., desktop or laptop), servers, personal digital assistants (PDAs), ultra mobile personal computers, smart phones, cellular telephones, pagers, and/or a system of these in any combination. In addition, a given computing device may be physically located completely in one location or may be distributed amongst a plurality of locations (i.e., may implement distributive computing). A computing device may even be a mobile device. Centralized tracking system 101 may further support co-operation with other non-bank tracking systems.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

Referring again to FIG. 1, bank client 102 may include not only registered customers of a bank that have a financial account (e.g., checking or savings account) maintained by the bank, but also customers that do not have a financial account with the bank but are otherwise doing business with the bank. Clients may also be another bank or a bank agent or business partner including local, state, or federal governments, and may also be extended to include a chain of a bank's customer's customers. As will be discussed, bank client 102 may receive a notification of an event along the cash supply chain at phone 102a or terminal 102b through a wireless network or the Internet.

Deposit location 103 is the location at which client 102 releases custody of the deposit (such as in the form of a monetary package). This custody may be released by, for instance, depositing the monetary into a cash handling device (e.g., a cash recycler, depository, exchange, dispensing machine, or ATM), or at a bank teller, or even at the client's own location where an armored carrier would pick up the deposit from the client. Pickup location 106 is the location at which client 102 receives custody of the monetary items (which may or may not be prepared by client 102 and which may be in the form of a monetary package), such as from an armored carrier, bank teller, or cash handling device.

Vault 105 is typically a secured location or device in a bank or customer's office where the deposit is processed. In the case of a vault in an armored carrier's or bank's facility, once the deposits are processed, currency or other monetary items are strapped for storage and distribution. A vault may not only process incoming monetary items but may also provide monetary items such as currency to clients. These requests for currency, commonly called "change orders," are generally standing orders for specific amounts that are sent on a specific schedule, but can be on-demand or non-standing orders that are requested for a specific time. With some embodiments, currency may be verified by the one transporting the currency. This may be because the carrier is trusted and in an appropriate liability agreement with the bank, or the bank owns a carrier. In that case, some or all of the funds may be verified (or trusted due to the device the funds came from) and re-used in the cash supply chain without going to the vault. For example, the carrier may use a hand-held device to check the next location to visit or receive notices that a site needs cash. The carrier may use the verified cash to fulfill the order.

Armored carrier 104a/104b (which may be referred to as a "vendor") transports monetary packages between different stages along the cash supply chain typically in an armored vehicle. The physical transportation could be any type of transportation, however, including a courier or package delivery service with a secured package.

Parties 102-106 may communicate with centralized tracking system 101 over corresponding communications channels. Different types of communications channels may be supported. For example, centralized tracking system 101 may communicate with client 102 through a computer terminal (via the Internet) and/or a wireless telephone, with an armored carrier through a handheld scanner with a wireless communications interface, and with a bank employee through a work station (e.g., via an intranet). A communications channel may utilize different communications media, including a wired telephone channel, wireless telephone channel, and/or wide area channel (WAN).

Figure 2:
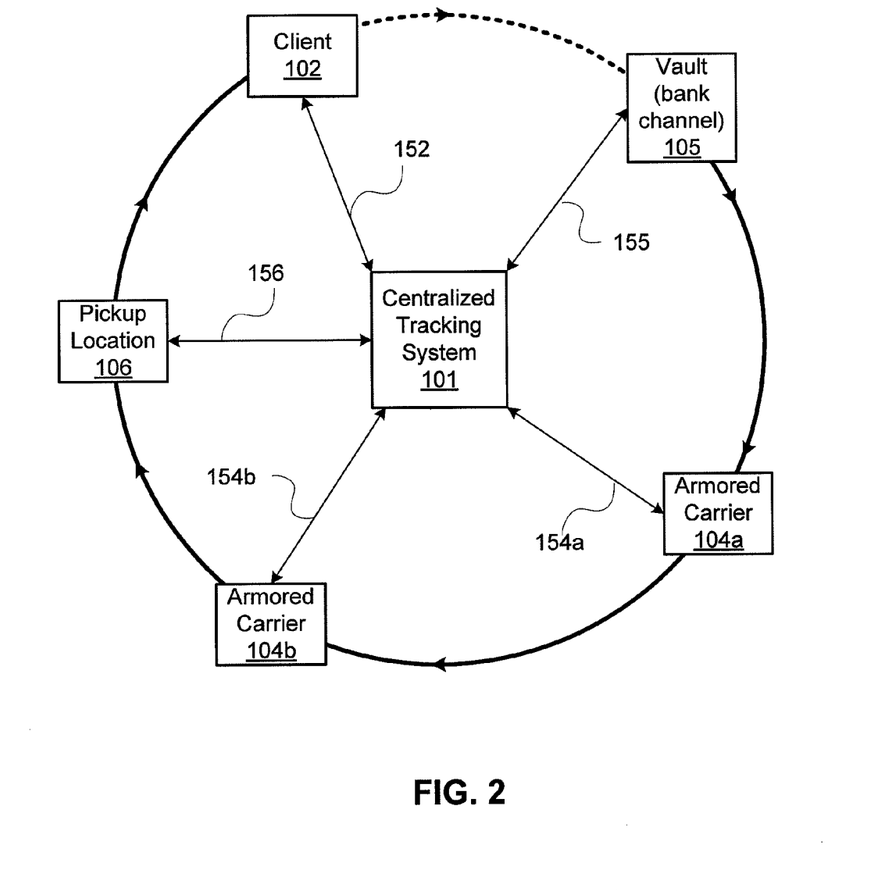
FIG. 2 is a graphical depiction of an illustrative cash supply chain for a change order lifecycle, including a centralized tracking system.

FIG. 2 is a graphical depiction of an illustrative cash supply chain for a change order lifecycle. A change order is a financial transaction in which a client (such as client 102) requests and receives a predefined sum in a predefined set of one or more denominations. For example, client 102 might request a particular amount of currency with X amount of ten dollar bills, Y amount of twenty dollar bills, and Z amount of one dollar bills. While any type of client may implement a change order, this type of transaction is particularly common for business clients that require a certain amount of currency in hand each day for their cash registers. With some embodiments, a change order may be initiated by the bank using forecasting systems for cash handling devices.

As can be seen in FIGS. 1 and 2, a monetary package transfers from party to party, with the exception of the broken line in FIG. 2 that indicates a request by client 102 rather than a physical transfer of a monetary package. Each time the monetary package changes hands and/or changes physical locations, centralized tracking system 101 may be updated. A physical location may two different nodes, or within the same node, of the cash supply chain. For example, monetary items are typically moved from receiving of a vault to a teller of the vault. In addition, any of these parties (or even other parties not shown) may at any time query centralized tracking system 101 to determine the current status, historical status, and planned future status of the monetary package. To aid in tracking monetary packages, each monetary package may physically include an identifying device having an associated identifier that is unique to that monetary package. The identifying device may be any device that stores human-readable and/or computer-readable information on some type of medium. Examples of such an identifying device include a radio-frequency identification (RFID) tag or other wirelessly readable tag, a bar code or other visual label, or printed ink made directly on or in the monetary package. The identifier itself may be made up of any one or more symbols that together make up a unique combination, such as one or more numbers, letters, icons, dots, lines, and/or any one-, two-, or higher-dimensional patterns.

Figure 3:
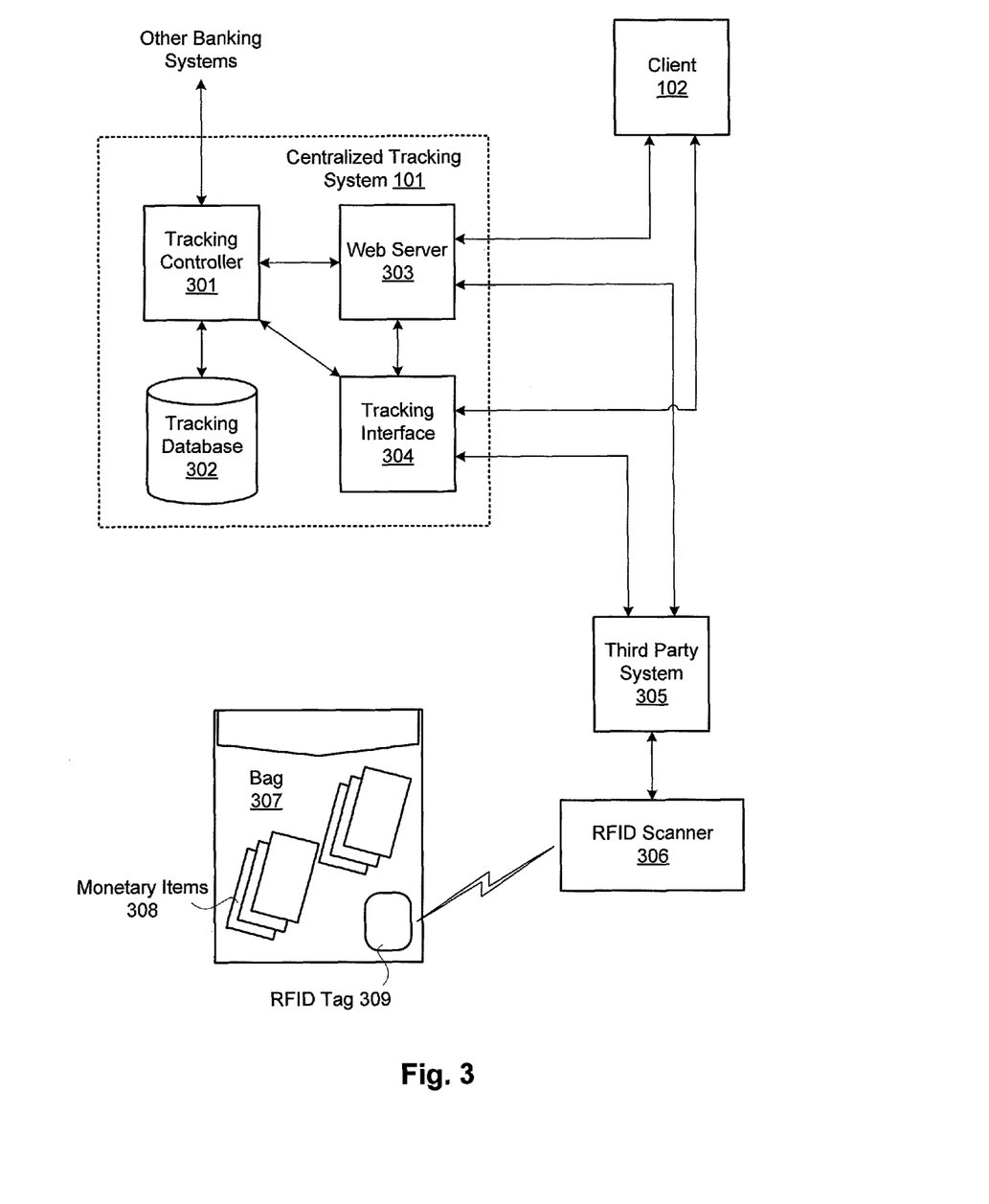
FIG. 3 is a functional block diagram of an illustrative monetary package tracking environment.

FIG. 3 is a functional block diagram of an illustrative monetary package tracking environment. In this example, centralized tracking system 101 is shown to include a tracking controller 301, tracking database 302, a web server 303, and a tracking interface 304. Each of units 301, 303, and 304 may be implemented as or otherwise include a computing device. It should be noted that the divisions between functional blocks in FIG. 3 is merely illustrative, and that the physical division of computing devices and other equipment may be different from the functional division. Moreover, some or all of the functional blocks may be combined or further subdivided functionally and/or physically.

Tracking database 302 may be implemented as or otherwise include a computer-readable medium for storing data. This data may be organized, for instance, as a relational database that is responsive to queries such as structured query language (SQL) queries. Tracking database 302 may be distributed and may collaborate with internal and/or external sources to fulfill the completeness of the data utilized for notifications.

In this example, tracking controller 301 may be configured to add, edit, update, delete, and query data stored in tracking database 302. The data stored in tracking database 302 may include, for instance, data indicating the current status of each of a plurality of monetary packages. For example, the data may indicate that a given monetary package is with a particular armored carrier, and that it was transferred to the armored carrier at a certain time on a certain date. The status data may be associated with the unique identifier of the relevant monetary package.

Web server 303 may be configured to generate an Internet web page that is accessible by client 102 and/or other parties. The web page may be used to query tracking database 302 via tracking controller 301. For example, a party using the web page may be able to enter an identifier associated with a monetary package. In response, web server 303 may request tracking controller 301 to query tracking database 302 (or alternatively web server 303 may generate the query itself) for that identifier. The query response is forwarded by tracking controller 301 to web server 303, and displayed on the web page for review by the party. The query response may include, for instance, the status data associated with the identifier. Many other types of query transactions are possible. In addition, updates, deletions, and additions may be made to the data in tracking database 302 via the web page generated by web server 303. For example, a party may desire to update status information about a particular monetary package via the web site, or may desire to add a new monetary package with a new identifier not previously included in tracking database 302.

Tracking interface 304 may be used as an alternative interface into tracking controller 301 and tracking database 302, without the need for an Internet web page. For example, data and queries may be provided to tracking controller 301 via tracking interface 304 using a short messaging system (SMS) message or other type of messaging from a cellular telephone.

FIG. 3 further shows an example of a third party system 305 (e.g., the computer system of armored carrier 104). System 305 may be embodied as or otherwise include a computing device, and may further include or be coupled with an identifier reader such as an RFID scanner 306 or a bar code reader. In this example, RFID scanner is configured to read an RFID tag 309 that is contained inside or otherwise attached to a bag 307 that also contains a quantity of monetary items 308. Using such a setup, the third party may, for example, read the identifier stored in RFID tag 309 using RFID scanner 306 (which may be a handheld or fixed location device), forward that identifier to tracking interface 304 or web server 303 along with the current status of bag 307 (e.g., in custody of the bank vault at a certain time and date). This current status may be added to the data in tracking database 302 and associated with the identifier. Then, when that party or another party later queries tracking database 302 for the same identifier, the status of bag 307, including the most recent status discuss above, may be returned in response to the query.

RFID tag 309 may be a passive RFID tag that does not contain its own power source. Rather, a passive RFID tag (e.g., its memory, controller, and transmitter) is powered by power inherent to a signal that is received from RFID scanner 306 or another signal source. Alternatively, RFID tag 309 may be an active RFID tag that contains its own power source.

The above discussion in connection with FIGS. 1-3 describes but a few examples of how monetary package tracking might be implemented. These and other implementations, as well as various features that may be provided in connection with monetary package tracking, will be discussed in further detail below.

Figure 4:
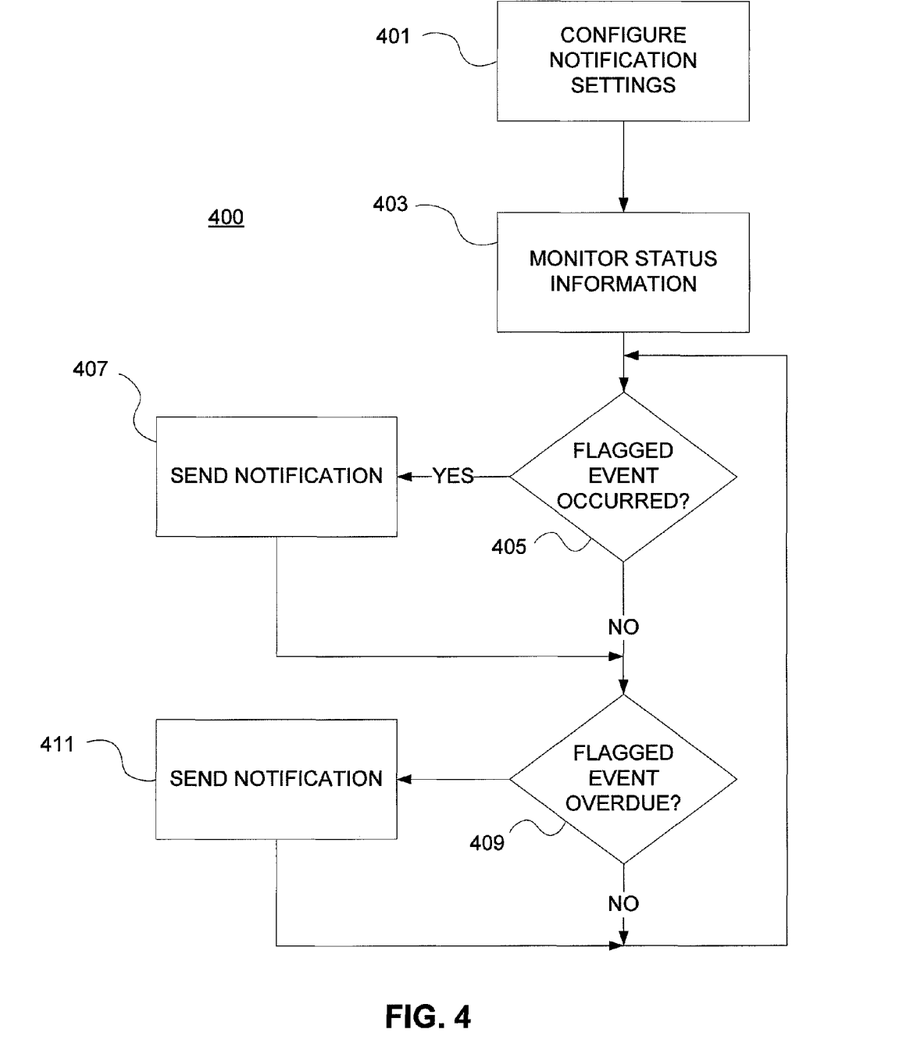
FIG. 4 shows a flow diagram for generating notifications in a cash supply chain in accordance with an illustrative embodiment.

FIG. 4 shows a flow diagram 400 for generating notifications (e.g., alerts and e-alerts) by monitoring events in a cash supply chain in accordance with an illustrative embodiment. Events include occurrences that happen as well as occurrences that do not happen within a predetermined time. A notification may encompass different forms, including e-mail, telephone messages, and notifications. Deposits, including monetary items such as cash (typically contained in a currency bag), may travel along the cash supply chain as the currency bag is tracked using RFIDs, barcodes, manual inputs, etc.

The cash supply chain is comprised of different stages. For example, six stages may be associated with the cash supply chain. In stage 1, a client prepares a deposit (monetary items e.g., cash and/or checks) for pick up by an armored carrier at the client site. In stage 2, a bank processes deposit bags that are delivered by an armored carrier at cash vault receiving. This stage can be any bank channel where deposits are processed like a banking center or a strategic partner location. In stage 3, a teller is assigned currency bags for processing in the cash vault. In stage 4, the teller processes currency bags in the cash vault. In stage 5, currency trays are taken to the sorter room after the tellers work has been verified for sorting and vault inventory. In stage 6, requests for cash to a client (change orders) are processed. This stage may indicate that a replenishment is needed.

In step 401, process 400 allows the user (e.g., client, bank employee, or carrier) to define notification settings, such as via the web site generated by web server 303. These notification settings may define under what circumstances a notification is to be generated, such as responsive to a particular event occurring or an expected event not occurring, such as a deposit being received by the bank, or the deposit not being received by the bank by a certain time. Also, for example, the bank may wish to be notified when a currency bag cannot be accounted for in cash vault 105. The armored carrier may also wish to be notified if a currency bag is missing from the armored truck, e.g., the currency may have been left behind at the pickup or may have fallen from the armored truck. The notification settings may further specify, for example, the event type (corresponding to a selected stage along the cash supply chain), a predetermined duration (if applicable) when the event type should have occurred by, a method of notification (e.g., by e-mail, instant message, or telephone call), and a destination to which the notification should be sent (e.g., an email address or telephone number). In addition, notification settings may be configured to generate notifications for events including auto-verification has not occurred, auto-verification matched, or auto-verification did not match the expected amount with the corresponding difference. Moreover, multiple notifications may be configured if a deposit is not created by a certain time or, if a deposit is created but is less than, equal too, or greater than some number. Notifications may also provide suggestions or tips based on customer data, customer or industry trends, historical data such as "did you know that you could decrease your transportation cost if you went to 2 day a week schedule?" or "did you know the bank offer transportation management service?"

Process 400 may support a portal (such as the web site generated by web server 303) that provides end to end visibility for both the client and internal operational monitoring. Process 400 allows the user (e.g., bank employee, carrier, or client) to define passive and active notifications and monitoring of selectable stages (points) along the cash supply chain. Process 400 supports adjustable and active notifications (e.g., alerts) of deposit status, missing deposits, change order shipment, potential loss prevention activity, proactive intervention, and so forth.

Process 400 provides tracking capabilities and client alerts, providing loss prevention and improved security through active monitoring and alerts. In addition to the above tracking capabilities, the customer and/or the bank may be provided with automated alerts that are responsive to certain events occurring (or not occurring as expected by a certain date/time) along the cash supply chain. The alerts, for example, may be sent via e-mail, text messaging, fax, telephone call, page, or online notice for an account that is viewable by users of specific entitlement.

In step 403, central tracking system 101 monitors (e.g., through tracking interface 304 as shown in FIG. 3) status information received from stages along the cash supply chain over a communications channel to central tracking system 101 via, e.g., tracking interface 304. If a first event type has occurred as detected by step 405 (based on a flagged event occurring), central tracking system 101 sends a notification (message) to a user (such as client 102) in step 407. Process 400 continues to process the status information to determine if a second event has not occurred within a predetermined duration in step 409 (based on a flagged event being overdue). If not, a notification (alarm) is sent to a user in step 411. While not explicitly shown in FIG. 4, process 400 may detect additional event types. Process 400 continues to monitor status information from the cash supply chain for subsequent events.

With some embodiments, process 400 may resend a notification if an event has not occurred by an elapsed time, send a notification that an event has been rectified and has occurred, and resend a notification a predetermined number of times before escalating the notification. Moreover, different people/groups may be notified based on the type of event.

Process 400 may generate various notifications from many types of events. For example, notifications may be generated responsive to events occurring at the armored carrier. The armored carrier may use a mobile handheld device that provides deposit tracking features and functions. After the armored carrier scans an RFID tag on a deposit, the handheld scanner remembers the tag, and displays a count of the deposit so the carrier can always tell that he or she has not lost a deposit (including deposit trash bags) The handheld scanner may beep, display a notification, and/or send status information to central tracking system 101, e.g., via tracking interface 304, if one of the deposits scanned goes out of range of the scanner (e.g. left in the customers office) before the carrier pushes a key on the handheld that indicates "deposits are in the truck". Reading the information from these actions may also provide better granularity for deposit tracking throughout the cash supply chain (e.g., customer site, truck, cash vault, vendor (carrier) barn, banking center, ATM, or cash handling device).

As another example, deposits at non-bank locations, and scheduled deposits at any locations, may be flagged as events whose occurrences (or lack thereof) are to be notified. A bank customer may deposit money at a non-bank location (which in this example would correspond to deposit location 103 as shown in FIG. 1). The deposit may also be scheduled prior to the deposit occurring. In either case, by using centralized tracking with notifications, the customer and the bank know that a deposit or auto-verification after a jam or after a change order delivery is expected and can verify whether it has occurred as expected. Process 400 may generate a notification if the deposit does not happen as expected.

A deposit may be scheduled by a business client with the bank's database. The scheduled deposit is associated in the database with the tracking identifier (e.g., RFID identifier) or the monetary package to be deposited, along with the cash amount included therein (optionally the amount is indicated by denomination). Subsequently, the client's agent goes to a deposit location and makes the deposit. The deposit event is sensed by an RFID sensor at the deposit location or by other means, in response to which an event notification is sent to tracking database 302 as shown in FIG. 3 via tracking interface 304. Any further events (e.g., pickup by armored carrier, transfer to armored carrier's barn, transfer to bank's cash vault, etc.) downstream along the cash supply chain may further be updated noted in tracking database 302 as those events occur. The client and/or the bank may be able to go online to the web site generated by web server 303 and check information in tracking database 302 to see the current status of the monetary package.

As another example, a self service change order and pickup service for cash and coin needs, similar to a web-based fulfillment model used for merchandise ordering, status tracking, and walk-up pick-up services being offered by retailers, supermarkets, and pharmacies. An embodiment integrates web-based cash ordering with location availability options, product tracking, status reporting, and utilizes walk-up kiosk or automated dispensing machines for clients to pick-up pre-packaged change-orders 24/7, including emergency orders at a premium price if supply is available. The change orders are prepared with tamper-resistant packaging (using RFID or similar technology) to ensure the integrity of the value from pick-up at the stage of dispensing and the client (in cases when an employee of the client picks-up the order). If desired, the client can automatically receive an electronic message from process 400 when the order changes custody and/or if the bag is opened by an unauthorized individual. The service transfers the time-consuming change-order volume from traditional banking centers to a self-service venue, and can offer 24/7 pick-up convenience to the client.

As another example of an event type that may be supported by process 400, when an associate or vendor (e.g., armored carrier) removes the contents of an ATM (e.g. one bag for cash, one bag for checks, or cassette from a cash handling device), an RFID scanner that is part of or connected to the ATM reads the bag ID number at the ATM. The ATM or the scanner may then send a message to central tracking system 101 via tracking interface 304 that a servicer has picked up the contents.

Process 400 may further monitor stages at or within cash vault 105, which is also part of the cash supply chain. For instance, a smart table, surface, or other cash handling workstation or other device may be located within the bank's cash vault 105 and outfitted with an RFID reader to read the RFID tags of the monetary packages (e.g., bags) on/near the table and automatically update the status of the monetary packages within the cash vault. The smart table may also indicate to the human operator (or automatically physically route via a mechanical system) to where each monetary package should go next, based on the RFID. A plurality of rollable carts may be used to move the monetary packages to another portion of the vault 105, and the smart table may indicate which smart cart each monetary package is to be placed in. Each smart cart may hold a plurality of trays that may also be RFID tagged. Because the database relates RFID tags with the contents of the monetary packages, the smart table may be able to route monetary packages within vault 105 based on the content of the monetary packages (e.g., based on the amount of money in the monetary package and/or based on the denominations of the monetary package). For instance, the smart table may direct each monetary package to a particular tray in a particular smart cart. The smart carts may also be outfitted with RFID tags, and cash vault 105 may have various RFID readers scattered throughout that keep track of the location of each smart cart, as well as which monetary packages and trays are on each smart cart at any given moment. Alternatively, each smart cart may read and keep track of which monetary packages and trays are on the smart cart. If there is a discrepancy at any time (as compared with where each monetary package should be according to the database), then an alert can be provided. The smart table and carts may thus provide the ability to monitor, track, alert, and notify movement of cart, and movement of contents on/off the cart as well as transfer of custody to associate and/or area. This may also be used in locations other than cash vault 105.

As another example supported by embodiments, a cart is pushed to a teller station in cash vault 105 (corresponding to stage 4 in the cash supply chain as previously discussed). The teller takes the tray and places it on their counter top. The existence of the mobile reader now knows that the tray is no longer on the transportation cart, but now is at the teller station. This teller's counter top may also equipped with RFID antennas, where the entire tray is associated with this teller. In today's environment, the teller typically takes each individual deposit bag and enters the declared amounts and account information into an input device before they can start verifying the cash. From RFID information, the teller can concentrate effort on verifying because the bag information is pre-populated as the teller moves each bag across the smart-desk. Since the teller already knows which bags are supposed to be in this tray, if one bag were missing or there were too many bags at this stage, the tracking system 101 would indicate this as soon as the tray is read. If a bag were in the wrong tray, tracking system 101 would send a message indicating the error. This type of real-time error detection is another benefit of RFID. For example, a bag may fall off the teller's desk into the trash, which is a very real scenario in cash vault 105. The teller would know the RFID tag number of the missing bag and could enter that into this handheld scanner. At that stage, the scanner becomes a type of "Geiger counter" allowing the teller to quickly the search the area and listen for the beeps to tell the teller when the missing bag has been found. Being able to quickly find missing bags greatly reduces risk in vault 105. Referring to the teller process, the teller now places the currency in the currency counter and the currency is counted and reconciled against the declared amount. If the actual amount does not match the declared amount, the difference would be displayed and that information would be available for the client through either the web portal screen (e.g., terminal 102*b* as shown in FIGS. 1 and 3) or through some kind of short message service (SMS) message or other notification device. The bank may store deposit bags for a certain period of time and may also store checks.

As another example, a cash bag may be modified to include an RFID tag, as previously described. In addition, the RFID tag may include a circuit that crosses one or more portions of the cash bag that are likely to be broken if the cash bag were opened. A likely place where a cash bag can be broken is along one of the seams. Thus, a conductive strip, conductive ink, or the like may be applied to the cash bag that cross such places likely to be broken. If the cash bag is broken, the conductor is also broken, thus causing a change in its impedance. This impedance may be detected by a circuit that is part of the RFID tag and consequently cause the event of the cash bag breaking to be noted. For example, the event may be recorded in a local memory of the RFID tag, and/or the RFID tag may wirelessly communicate the event to an RFID tag reader, which may in turn send status information to central tracking system 101 so that a notification can be generated. Also, with some embodiments, a dark bag with a light sensor that indicates tampering may be used.

Figure 5:
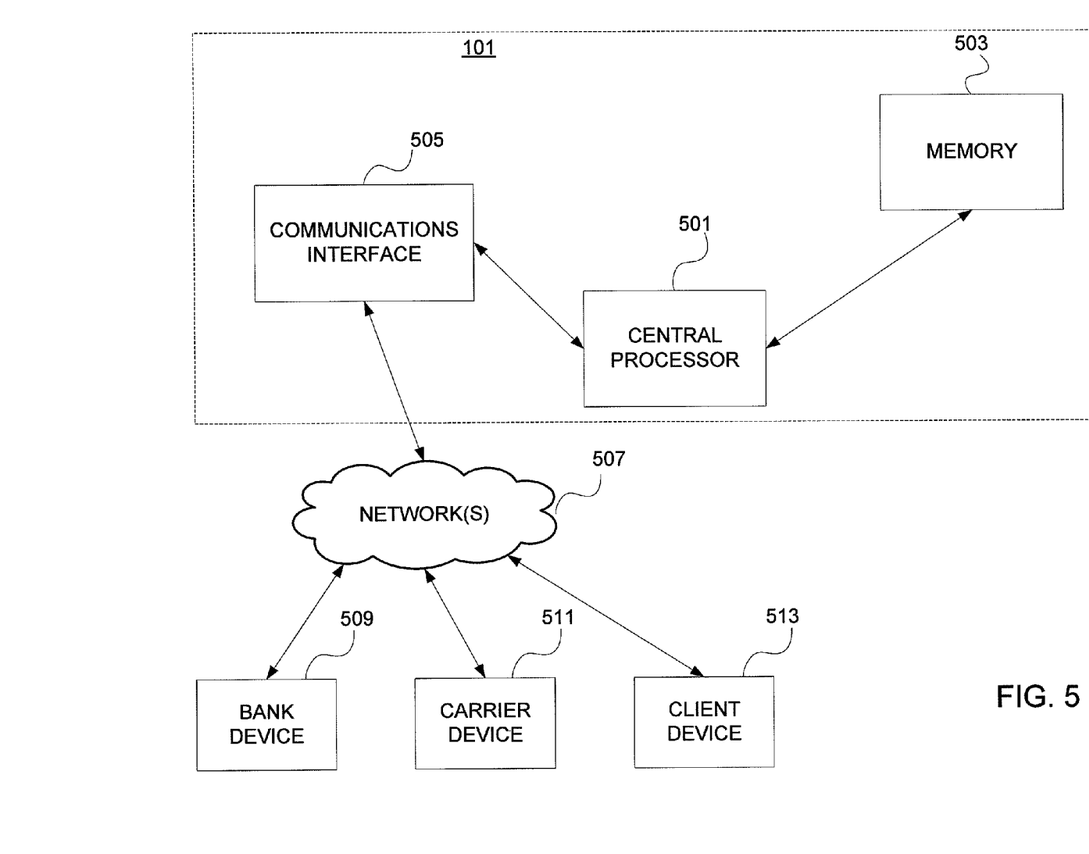
FIG. 5 shows an apparatus for a centralized tracking system in accordance with an illustrative embodiment.

FIG. 5 shows apparatus for centralized tracking system 101 in accordance with an illustrative embodiment. Central processor 501 executes computer-executable instructions from memory 503 in order to perform notification configuration, status tracking, event detection, and notification generation corresponding to process 400 as shown in FIG. 4.

Central processor 501 obtains status information from and sends notifications to bank device 509, carrier device 511, and client device 513 through network 507 and interface 505.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Various aspects have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A computer-assisted method comprising:
configuring a notification setting, wherein the notification setting specifies an event type of a future event for transporting a monetary package through a cash supply chain;
monitoring status information representing a status of the monetary package at a selected stage in the cash supply chain;
detecting a first event in the cash supply chain based on the status information; and
generating, by a computing device, a first notification responsive to the first event being detected and based on the notification setting; and
determining a selected recipient of the first notification from a plurality of recipients based on the event type of the first event, wherein the selected recipient is a non-participant during the first event.

2. The method of claim 1, wherein the generating comprises:
generating the first notification such that the notification identifies the first event.

3. The method of claim 1, further comprising:
scheduling a second event corresponding to one of the cash supply chain stages;
determining whether the second event does not occur as scheduled; and
generating a second notification responsive to the second event not occurring as scheduled.

4. The method of claim 1, wherein the notification setting comprises a notification type.

5. The method of claim 1, wherein the notification setting comprises a predetermined duration.

6. The method of claim 1, wherein the generating comprises:
providing the notification about the event to a user via the Internet.

7. The method of claim 1, wherein:
the first event corresponds to an absence of the monetary package at the selected cash supply chain stage.

8. The method of claim 1, wherein:
the first event corresponds to an occurrence of a receipt of the monetary package at the selected cash supply chain stage.

9. The method of claim 1, wherein:
the first event corresponds to an occurrence of a transfer of the monetary package from the selected cash supply chain stage.

10. The method of claim 1, wherein the first event is the monetary package changing custody.

11. The method of claim 1, wherein the first event is a pickup of the monetary package by an armored carrier.

12. The method of claim 1, wherein the first event is a transfer of the monetary package to a barn of an armored carrier.

13. The method of claim 1, wherein the first event is a transfer of the monetary package to a cash vault.

14. The method of claim 1, wherein the notification setting indicates that the first notification comprises an e-mail.

15. The method of claim 1, wherein the notification setting indicates that the first notification comprises a telephone call.

16. The method of claim 1, wherein the notification setting indicates that the first notification comprises a short message service (SMS) message.

17. An apparatus comprising:
a memory;
a communications interface; and
a processor coupled to the memory and configured to perform, based on instructions stored in the memory:
configuring a notification setting;
monitoring status information representing a status of a monetary package at a selected stage in a cash supply chain;

detecting a first event in the cash supply chain based on the status information; and generating a first notification responsive to the first event being detected and based on the notification setting;

determining a selected recipient of the first notification from a plurality of recipients based on an event type of the first event, wherein the selected recipient is a non-participant during the first event;

responsive to determining that a second event has not occurred within a predetermined time duration, generating an associated notification; and responsive to determining that the second event has subsequently occurred, generating a subsequent notification indicative that the second event has occurred.

18. The apparatus of claim 17, wherein the generating comprises:

generating the first notification such that the notification identifies the first event.

19. The apparatus of claim 17, wherein the processor is further configured to perform:

scheduling a second event corresponding to one of the cash supply chain stages;

determining whether the second event does not occur as scheduled; and generating a second notification responsive to the second event not occurring as scheduled.

20. A computer-readable storage medium storing computer-executable instructions that, when executed, cause a processor to perform a method comprising:

specifying, in a notification setting, an event type for a future event during transporting a monetary package through a cash supply chain;

monitoring status information representing a status of the monetary package at a selected stage in the cash supply chain;

detecting a first event in the cash supply chain based on the status information; and generating a first notification responsive to the first event being detected and based on the notification setting;

determining a selected recipient of the first notification from a plurality of recipients based on the event type of the first event, wherein the selected recipient is a non-participant during the first event.

21. The computer-readable storage medium of claim 20, wherein the generating comprises:

generating the first notification such that the notification identifies the first event.

22. The computer-readable storage medium of claim 20, wherein:

scheduling a second event corresponding to one of the cash supply chain stages;

determining whether the second event does not occur as scheduled; and generating a second notification responsive to the second event not occurring as scheduled.

23. The method of claim 1, wherein the first notification includes a suggestion to a customer.

24. The method of claim 3, wherein the second event occurs after the monetary package has entered the cash supply chain and at a location along the cash supply chain that is different from the first event.

25. The method of claim 1, further comprising:

when a second event has not occurred within a predetermined time duration, generating an associated notification; and when the second event has subsequently occurred, generating a subsequent notification indicative that the second event has occurred.

\* \* \* \* \*